United States Patent [19]

Gotman

[11] Patent Number: 4,699,528
[45] Date of Patent: Oct. 13, 1987

[54] ROTARY ASSEMBLY HAVING SELF-POSITIONING BEARING, AND METHOD

[75] Inventor: Alexander Gotman, Los Angeles, Calif.

[73] Assignee: Zephyr Manufacturing Company, Inglewood, Calif.

[21] Appl. No.: 854,315

[22] Filed: Apr. 21, 1986

[51] Int. Cl.⁴ .................... F16C 27/04; F16C 27/06; F16C 43/00; F16C 33/64

[52] U.S. Cl. .................... 384/536; 384/518; 384/535; 384/538

[58] Field of Search ............... 384/445, 456, 493–498, 384/510, 517, 518, 535, 536, 538, 558, 563, 581–585, 612, 620

[56] References Cited

U.S. PATENT DOCUMENTS

| | | | |
|---|---|---|---|
| 1,811,679 | 6/1931 | Volet | 384/538 |
| 1,957,062 | 5/1934 | Graham et al. | 384/538 |
| 2,509,587 | 5/1950 | Creson | 384/518 |
| 2,588,636 | 3/1952 | Korsgren | 384/536 |
| 2,926,051 | 2/1960 | Cazier et al. | 384/535 |
| 3,316,036 | 4/1967 | Bligard et al. | 384/536 |
| 4,486,055 | 12/1984 | Rohloff | 384/535 |

FOREIGN PATENT DOCUMENTS 973988  8/1960  Fed. Rep. of Germany ...... 384/518

Primary Examiner—Stuart S. Levy
Assistant Examiner—Thomas R. Hannon
Attorney, Agent, or Firm—Gene W. Arant

[57] ABSTRACT

A rotary assembly includes a shaft, a housing, and a bearing interposed between shaft and housing to provide radial support while also permitting relative rotation.

The invention permits optimum operation of the bearing, by permitting the bearing to be self-positioned even though slightly out of alignment with either the shaft or the housing, or both.

This is accomplished by providing a radial space between the bearing and the shaft or housing; placing a generally ring-shaped compensating member in circumferential engagement with the associated cylindrical surface of the shaft or housing; providing a longitudinal taper on the outer surface of the associated end of the bearing; and then placing the tapered surface of the bearing in overlapping engagement with the compensating member and resiliently urging the bearing and the compensating member axially together so as to provide a firm support both radially and axially for the bearing.

In the complete rotary assembly a radial space is preferably provided adjacent both the shaft and the housing, and separate inner and outer compensating members are utilized, one for the shaft and one for the housing.

18 Claims, 13 Drawing Figures

$f = \tan \alpha$

ROTARY ASSEMBLY HAVING SELF-POSITIONING BEARING, AND METHOD

BACKGROUND OF THE INVENTION

In the operation of rotating assemblies the performance capabilities such as rotational speed, ability to carry axial, transverse, and torque loads, permissible operating temperatures, permissible temperature changes, and useful life, are limited by many factors. Also, rotating assemblies which are designed to meet high-level performance requirements will in general be more demanding in terms of manufacturing tolerances, difficulty of original assembly, and difficulty of disassembly and re-assembly for the purpose of repair.

In particular, in fitting a ball bearing into place between a shaft and a housing which are to be supported for relative rotation, it has been customary to make the bearing assembly as precisely concentric as possible, with respect to both the shaft and the housing. It is extremely important to prevent rotation of the inner and outer rings of the ball bearing relative to the shaft and housing with which they are respectively associated. Established industry practice has mandated precise tolerances for the outer cylindrical surface of the shaft, the inner cylindrical surface of the shaft housing, and the inner and outer cylindrical surfaces of the inner and outer rings, respectively, of the ball bearing. Furthermore, assembly procedures have been difficult and time-consuming, both during original manufacture and during repair procedures, because the ball bearing must be mated to both the shaft and the housing. An interference fit is required between one ring and the rotating member (housing or shaft) while a sliding fit is required between the other ring and the stationary or non-rotating member (shaft or housing). In certain applications, however, an interference fit is required for both members.

It has long been understood that construction of a precise assembly has a natural enemy in the form of expansions and contractions of the various component parts which necessarily occur during operation of the mechanism, because of temperature changes that result from the operation and because of thermal expansion of the material or materials used to construct the assembly. Thus, it has been common practice to include in a rotary assembly certain parts whose sole purpose is to provide temperature compensation.

For example, in a rotary assembly the operating temperatures may cause the shaft to elongate much more than the housing, or vice versa. Since the shaft is usually supported from two or more bearing assemblies which are axially separated, there has to be an axial adjustment of the position of all but one of the bearing assemblies in order to accommodate the temperature change. It is therefore common practice to utilize a spring means in conjunction with a ball bearing, to maintain the axial position of the bearing with respect to one of the shaft or housing.

An additional problem is that wear of the parts of a rotating assembly changes the original dimensions, and hence the operating characteristics, including the manner in which those characteristics are affected by temperature changes.

OBJECTS OF THE INVENTION

One object of the invention is to provide an improved rotary assembly in which certain component parts may be manufactured to lower tolerances than heretofore required, without any loss of operating performance, and preferably while even improving the performance.

Another object of the invention is to provide an improved high-performance rotary assembly which is much easier to assemble or disassemble than prior such assemblies.

An additional object of the invention is to provide improvements in rotating assemblies that utilize ball bearings or other bearings that are subjected to both radial and axial loads.

SUMMARY OF THE INVENTION

According to the invention a misalignment between a ball bearing and its associated shaft, shaft housing, or both, is deliberately permitted. More specifically, the position of the ball bearing is permitted to be non-concentric, as well as angularly tilted, with respect to the axis of the shaft, or the axis of the housing, or both. However, the concentric alignment of the shaft within the housing must be maintained within allowable limits.

The invention accomplishes this result in the following manner. Where a fit would normally be made between a ring of the ball bearing and one of the cylindrical surfaces—either shaft or housing—which supports it, a radial space or gap of generally annular configuration is instead deliberately created. This is done by making the inner diameter of the housing larger than would otherwise be required, or making the outer diameter of the shaft smaller than would otherwise have been required. Then a compensating member of generally ring-shaped configuration is inserted within that radial space, and circumferentially engages the cylindrical surface of the shaft or housing. The compensating member has a radial thickness which is somewhat greater than the radial space or gap. While the compensating member is made of rigid material it has a circumferential gap and is resiliently deformed so that it remains radially pressed against the cylindrical surface. A longitudinally tapered surface of the bearing ring overlaps and radially engages the compensating member. A spring means of the rotary assembly is utilized to urge the compensating member axially against the ball bearing. The compensating member may then become slightly misaligned relative to the shaft or housing.

In the preferred form of the invention, separate inner and outer compensating members are provided, one for the inner ring of the ball bearing and the other for the outer ring. Thus, not only does the ball bearing receive a firm radial support, but the shaft and the housing are also firmly radially supported relative to each other. By this means the ball bearing becomes self-aligned with respect to both the shaft and the housing.

The overlapping surfaces of compensating member and the bearing ring (the longitudinally tapered surface thereof) are so designed that a firm radial support is provided, but at the same time a jamming effect is avoided. Furthermore, the compensating member is longitudinally slidable upon the cylindrical surface of the associated shaft or shaft housing —not only before the assembly is completed, but also when the assembly is fully in place and the compensating member carries the radial support of the ball bearing. Therefore, when a change occurs in the relative axial lengths of shaft and shaft housing—whether due to temperature, load, or wear factors—the compensating member under axial pressure of the spring means which supports it, will slide in the axial direction upon the cylindrical surface of the associated shaft or housing, to a sufficient extent to compensate for that change.

An important advantage of the invention is that it eliminates all play inside the ball bearing, both axially and radially, i.e., between the balls and the raceways of the respective rings, and the ball bearing operates in its optimum operating mode despite its misalignment with the associated shaft and/or housing. Furthermore, two or more ball bearings utilized in a single rotary assembly, when supported in accordance with the present invention, will all operate in their optimum modes, simultaneously.

An additional advantage of the invention is that parts may be manufactured to lower tolerances, and both assembly and disassembly are much easier.

The invention applies not only to ball bearings but also to any other type of bearing which carries both radial and axial loads.

DETAILED DESCRIPTION OF THE INVENTION (Preferred embodiment—FIGS. 1–6 & 10)

Reference is now made to the drawings, FIGS. 1–6 and 10, which illustrate the presently preferred form of the invention.

Figure 1:
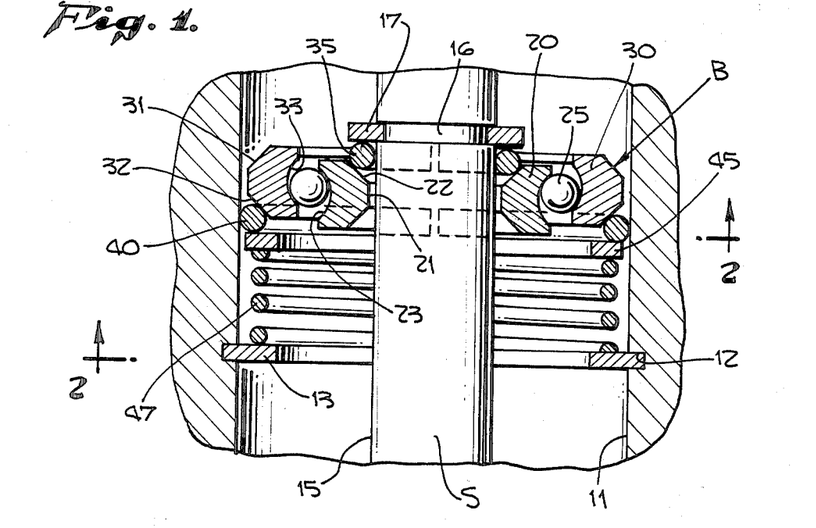
FIG. 1 is a longitudinal cross-sectional view of a rotary assembly which incorporates the presently preferred form of my invention.
Figure 2:
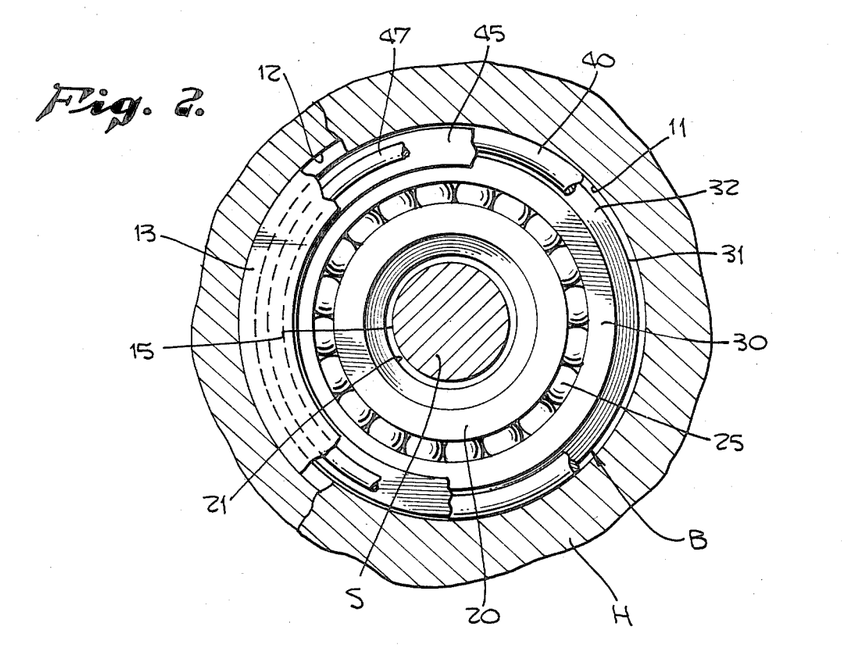
FIG. 2 is a transverse cross-sectional view taken on line 2—2 of FIG. 1.
Figure 3:
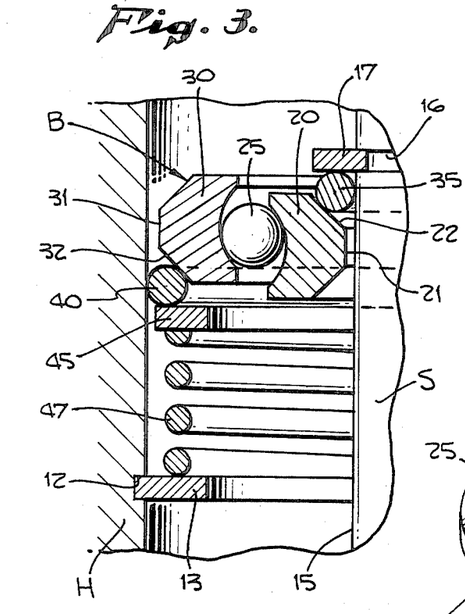
FIG. 3 is an enlarged fragmentary view of a portion of FIG. 1.

A ball bearing B is of conventional construction, including inner and outer rings with their respective raceways, and a set of balls, as will later be described in more detail. A shaft S has been selected which, according to conventional thinking, is too small for the ball bearing B; and a housing H has been selected which according to the same conventional thinking is too large. This illustrated embodiment of the invention is intended for use in the situation in which housing H is stationary and does not rotate, while shaft S rotates within the housing.

In accordance with the invention an inner compensating member 35 and an outer compensating member 40 have been added into an otherwise conventional assembly. The details of the arrangement and the reasons for it will now be explained.

Housing H has an inner cylindrical surface 11 in which a circumferential groove 12 is formed. An outer snap-ring 13 is received in and retained by the groove 12. As is conventional, the snap-ring 13 provides a fixed axial support relative to housing H for one end of ball bearing B, although of course a retaining ring or shoulder may be used for that purpose. Here the term "end" is used in the sense of an axial end.

Shaft S has an outer cylindrical surface 15 in which a circumferential groove 16 is formed. An inner snap-ring 17 is received in and retained by the groove 16. As is conventional, the snap-ring 17 provides a fixed axial support relative to shaft S for the other end of ball bearing B.

The ball bearing B, of conventional construction, includes an inner ring 20, an outer ring 30, and a set of balls 25 positioned between the rings. The inner raceway provided by the outer surface of inner ring 20 is designated by numeral 23, while an outer raceway provided by the inner surface of outer ring 30 is designated by numeral 33. In accordance with conventional ball bearing technology the rings, when properly supported, will eliminate both radial and axial play of the balls, and at the same time the balls provide a low-friction rotating relationship between the two rings while also giving a firm radial support to the shaft and housing relative to each other.

Inner ring 20 has a cylindrical inner surface 21, which in turn has a chamfered surface 22 at one end thereof. Thus, at the axial end of ring 20 its inner diameter is greater than at its axial center. Outer ring 30 has a cylindrical outer surface 31 which is chamfered at its other end, identified by numeral 32, resulting in smaller diameter.

An inner compensating member 35 is of circular cross-section and has sufficient cross-sectional diameter that it will not fit between shaft S and the inner cylindrical surface 21 of the inner ring. However, its cross-sectional diameter is sufficiently small that the chamfered surface 22 overlaps it in radial as well as axial engagement therewith.

Outer compensating member 40 is also of circular cross-section, and is fitted within and engages the circumferential wall 11 of housing H. Member 40 will not fit between the housing and cylindrical surface 31 of the outer ring, but it is overlapped and engaged by the chamfered surface 32. Again, the engagement is in both axial and radial directions.

Inner compensating member 35 receives axial support directly from the snap-ring 17; that is, it abuts directly against snap-ring 17 in the axial direction. Outer compensating member 40, however, receives axial support from a flat circular washer 45. That washer in turn is resiliently supported by a helical spring 47 whose other end is fixedly supported by the outer snap-ring 13.

The axial supports which consist of the snap-ring 17 at one end of ball bearing B and the combination of snap-ring 13 and spring 47 at the other end are entirely conventional. The effect is to resiliently urge the inner ring 20 and outer ring 30 axially towards each other at all times. Thus, axial play of balls 25 between the two raceways is essentially eliminated at all times, regardless of wear factors or temperature effects.

In a conventional rotary assembly, however, it is the practice to have one of the rings tightly fitted to the adjacent member—shaft or housing—while the other has a sliding fit. More specifically, the stationary ring which does not rotate is provide with a sliding fit so that it can move longitudinally or axially relative to its supporting member. And the ring which does rotate is provided with either a firm press fit or an interference fit upon its supporting member—shaft or housing—to assure that in fact it will rotate with that member.

Unfortunately, in conventional practice the necessary precise mounting of the two rings relative to shaft and housing may result in some degree of misalignment within the interior parts of the ball bearing. That is, the spacing between the rings, and hence between the raceways that they carry, may not be correct for all conditions of rotation, with the result that the balls 25 may experience axial play or radial play or both.

But in accordance with the present invention this problem is eliminated by the self-positioning support that is provided for ball bearing B. That is, ball bearing B may be slightly misaligned with shaft S or with housing H or with both, but the correct internal alignment of the parts of the bearing will exist at all times.

Figure 10:
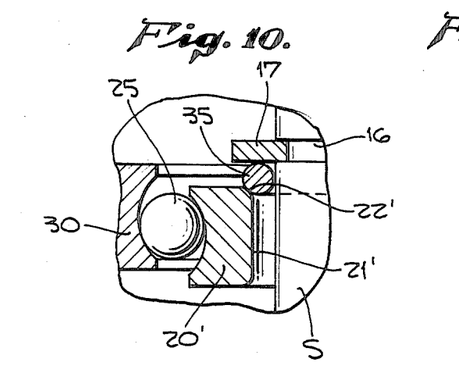
FIG. 10 is a cross-sectional view showing a ball bearing with a curved surface engaging a compensating member in accordance with the invention.

It is not necessary to modify or alter a conventional ball bearing in order to provide the chamfered surfaces 22 and 32, because many standard ball bearings are presently manufactured with that configuration. Even more are made with a rounded axial end of the bearing ring—see FIG. 10. As shown in FIG. 10, inner ring 20' has an outer cylindrical surface 21' whose axial end is curved longitudinally at 22'. Inner compensating member 35 engages the curved surface 22'.

Figure 6:
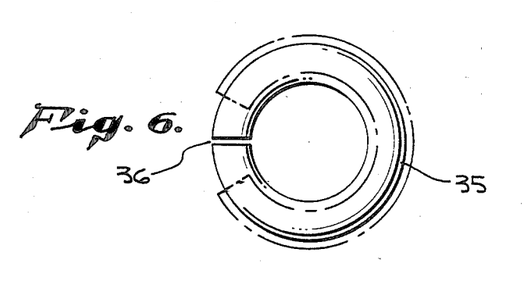
FIG. 6 is a view of the inner compensating member of FIG. 1.

As best seen in FIG. 6, inner compensating member 35 has a gap 36 at one point on its circumference. The solid lines show the natural or unstressed configuration of the compensating member. The member is made of rigid material having resilient deformation capability, such as a suitable grade of spring steel. Therefore, it can be resiliently deformed radially outwardly to a larger diameter, as indicated in dotted lines. In the dotted line illustration the width of gap 36 is exaggerated. During assembly, the resilience of inner compensating member 35 permits its diameter to be expanded so that it will slide onto shaft S.

Figure 4:
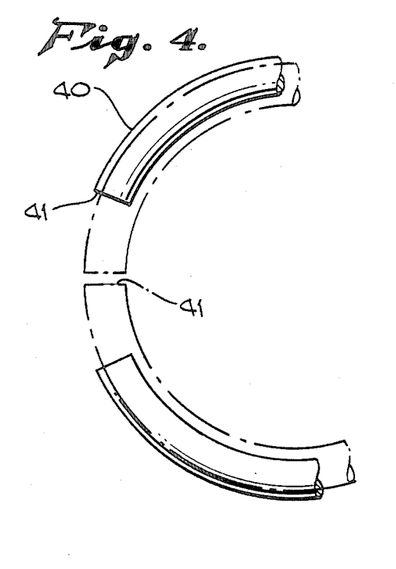
FIG. 4 is a fragmentary view of the outer compensating member of FIG. 1.
Figure 5:
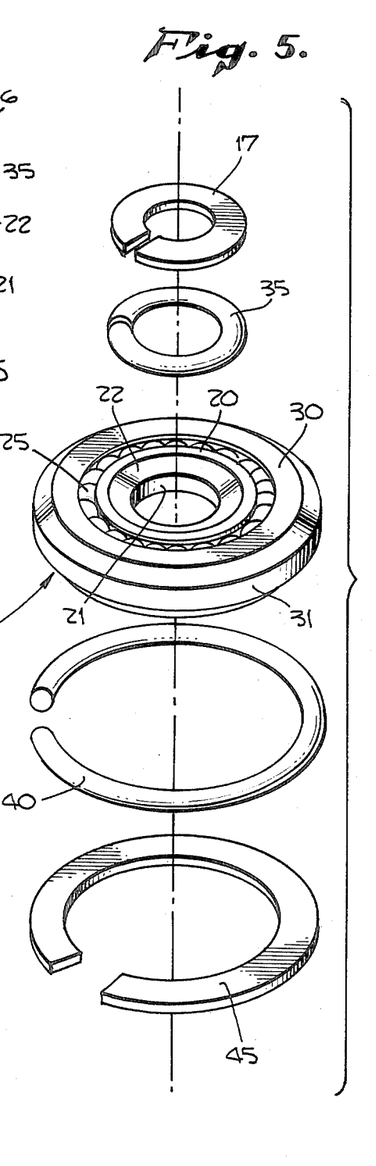
FIG. 5 is an exploded perspective view of the ball bearing of FIG. 1 together with its immediately adjacent supporting parts.

As shown in FIG. 4, outer compensating member 40 also has a gap 41 at one point on its circumference. The solid lines show the natural or unstressed condition of the compensating member in which the circumferential gap is fairly large. Like the inner compensating member, the outer compensating member is also made of rigid material having resilient deformation capability. Therefore, it can be resiliently deformed radially inwardly to assume a smaller diameter. Its normal diameter is too large to fit inside housing H, hence it must be deformed inwardly in order to assume its place in the rotary assembly.

OPERATION

The operation of the preferred embodiment will first be discussed with reference to inner ring 20 and inner compensating member 35. The compensating member is fixed against axial movement by the inner snap-ring 17. Therefore, the unique function of the compensating member is to permit self-positioning of ball bearing B; i.e., position which is correct for the interior parts of the bearing whether or not in precise alignment with shaft S.

Outer ring 30 and outer compensating member 40 will now be discussed. The outer compensating member supports the outer ring in a manner to permit self-positioning of that ring; that is, a correct position for the interior parts of the bearing whether or not in precise alignment with housing H. In the course of accomplishing that result, outer compensating member 40 may become slightly misaligned relative to housing H.

Each of the compensating members provides at least three points of support for its associated ring. The amounts by which the various component parts of the assembly may be out of tolerance or may differ from their precise theoretical configuration is very difficult both to predict and to measure. However, it is known from basic mechanics that even though the configuration of both bearing ring and compensating member may be imperfect, when forced together they will have a firm supporting interengagement at three points. In accordance with the present invention it is not necessary to know or predict precisely where those three points are or will be.

The outer compensating member 40 also performs another important function, which is to slide axially relative to housing H as required. In order for this to occur, a certain angular relationship must exist. More specifically, it is necessary that the outer ring 30 derive a firm radial support from the outer compensating member. This requires that the overlapping engagement of the two members produce a wedging effect in the radial direction. But at the same time a jamming action is avoided. If a jamming action were to occur, the outer compensating member 40 would become unable to slide axially along the interior wall 11 of housing H, as it needs to do from time to time.

Figure 12:
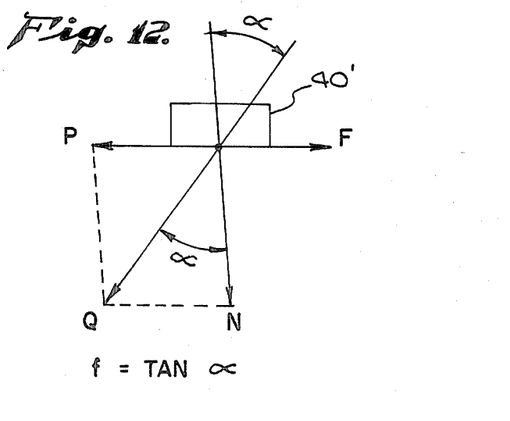
FIG. 12 is a force diagram illustrating a critical angle.

Reference is made to the schematic drawing of FIG. 12. In FIG. 12 a block 40' represents the outer compensating member 40, while Q represents a force that is applied at an angle to the block. Force Q is applied at an angle Alpha relative to a direction that is perpendicular to a surface upon which the block rests. From force Q, a component N is normal to the supporting surface (a vertically downward arrow in the figure) while a component P tends to propel the block to slide along its supporting surface. There is of course a certain coefficient of static friction between the material of the block and the material of its supporting surface. The force generated by the static friction, and which must be overcome by force P, is indicated by an arrow F which extends to the right. In order that the block be able to slide, it is necessary that the tangent of angle Alpha be greater than the coefficient of friction f which exists between the block and its supporting surface.

Applying the foregoing discussion to the illustrated mechanism, in order to permit the required sliding action of compensating member 40 in the axial direction, the tangent of the angle at which total force is applied to the compensating member, measured relative to a line that is perpendicular to the surface 11 of housing H, must be greater than the coefficient of static friction between compensating member 40 and surface 11.

An additional requirement imposed on the compensating member 40 is that it not rotate about the longitudinal axis of housing H. No special provisions are needed in order to meet this requirement, because of the low rolling friction of balls 25 relative to the sliding friction of this member.

Figure 9:
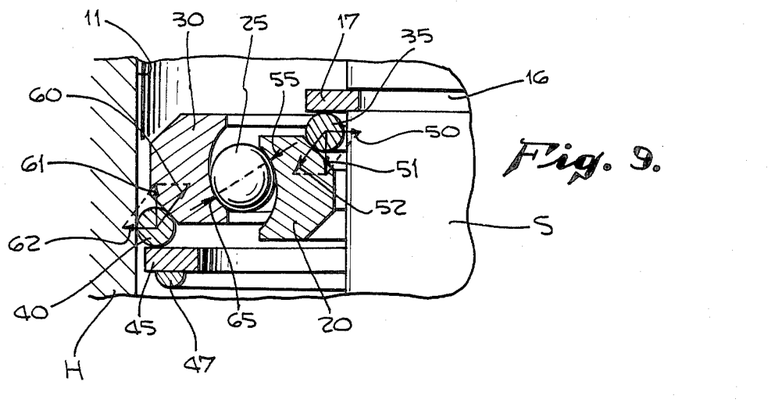
FIG. 9 is a fragmentary view similar to FIG. 3, but with arrows indicating certain forces.

FIG. 9 provides a partial analysis of the forces that exist between compensating members and ball bearing, and within the ball bearing itself. An arrow 50 indicates the radially applied force from inner compensating member 35 upon shaft S. An equal radial force 60 is applied in the other direction by outer compensating member 40 upon the interior wall 11 of housing H. Total force applied by compensating member 35 upon inner ring 20 is indicated by arrow 52, which is normal to the chamfered face of the ring. The components of force 52 are axial force 51 and the radial force 50. Total force 62 applied to outer ring 30 has similar components 60 and 61.

Thus for compensating member 35 the angle Alpha is measured between a rearward extension of arrow 52 and the arrow 50 which represents a plane perpendicular to the longitudinal axis of shaft S. And for compensating member 40 the angle Alpha is measured between a rearward extension of arrow 62 and the arrow 60 representing a plane perpendicular to the longitudinal axis of housing H.

A force 55 is applied from inner ring 20 to a ball 25. The direction of this force is normal to the interengaging surfaces, and does not necessarily coincide with the direction of force 52. In similar fashion, a force 65 is applied from outer ring 30 to the ball 25, whose direction does not necessarily coincide with the direction of force 62.

ALTERNATE FORMS

Figure 7:
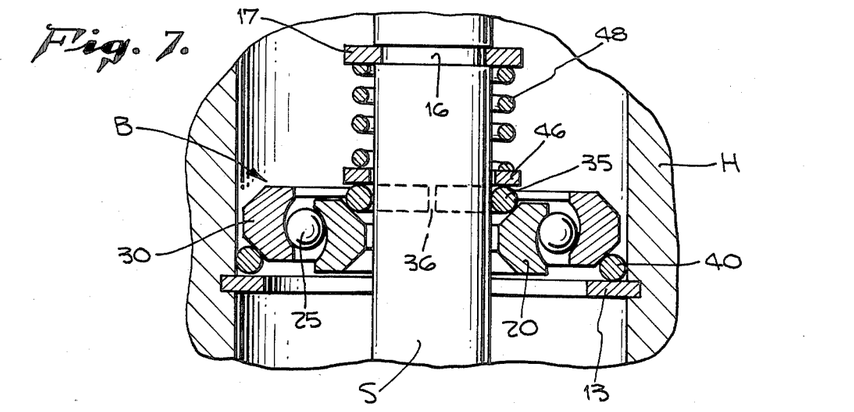
FIG. 7 is a view like FIG. 1, but showing a second embodiment of the invention.

In the embodiment of FIG. 7, the shaft is stationary while the housing rotates. A washer 46 provides axial support to inner compensating member 35, and a spring 48 is placed between inner snap-ring 17 and the washer 46. The operation is generally the same as for the preferred embodiment, except that the inner compensating member slides axially upon the shaft while the outer compensating member is fixed relative to the housing.

Figure 8:
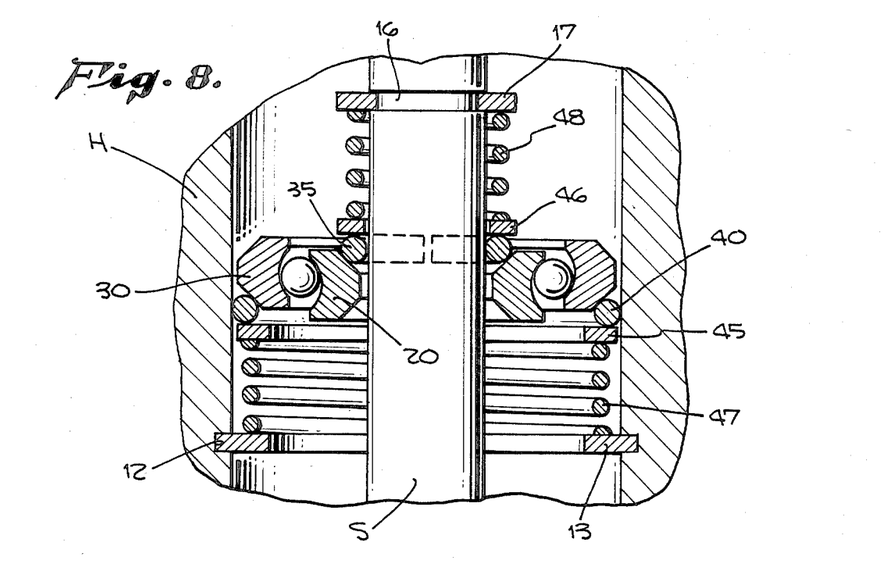
FIG. 8 is a view like FIG. 1 showing yet a third embodiment of the invention.

FIG. 8 illustrates an embodiment in which both compensating members are axially supported by springs and would therefore both be free to slide axially.

Figure 11:
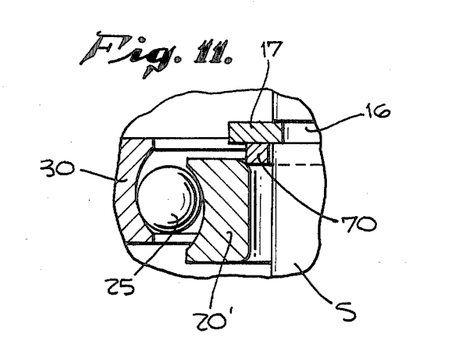
FIG. 11 is a view similar to FIG. 10 but showing a compensating member with a rectangular cross-section.

FIG. 11 shows an alternating form of compensating member 70 which may be of square cross-sectional configuration as shown. If desired, a compensating member of rectangular or other cross-sectional configuration may be used to carry out the present invention.

Figure 13:
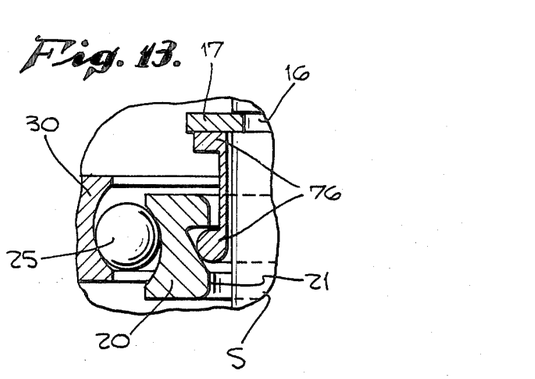
FIG. 13 is a view, partly in cross-section, illustrating an alternative form of the invention in which the ball bearing has a special groove to receive the compensating member.

FIG. 13 illustrates another embodiment of the invention in which a circumferential notch 75 is specially cut in the surface of cylindrical wall 21 of the inner ring. A compensating member 76 has a portion which then occupies this notch, forming an overlapping engagement in which the supporting force of the compensating member is applied to the inner ring at an appropriate angle.

While the invention has been illustrated with both inner and outer compensating members, it should be understood that in some applications a significant advantage can be obtained by using only one of these members. Where a single compensating member is used, it is most advantageous for that side of the bearing (inner or outer) which has a sliding support.

The invention has been fully illustrated in at least one of its forms in order to comply with the requirements of the patent law. Its scope, however, is to be limited only by the appended claims.

What I claim is:

1. In a rotary appratus which includes a shaft, a housing surrounding the shaft, and a ball bearing of generally annular configuration having inner and outer surfaces and which is disposed within the housing and about the shaft for radially supporting the shaft relative to the housing while permitting relative rotation between them, the improvement comprising:
   the shaft being smaller than the inner diameter of the ball bearing and the housing being larger than the outer diameter of the ball bearing, so that both shaft and housing are radially spaced from the ball bearing;
   a generally ring-shaped inner compensating member encircling the shaft at one axial end of said bearing assembly, having a radial thickness greater than the radial space between bearing assembly and shaft, and circumferentially engaging the shaft;
   a generally ring-shaped outer compensating member disposed at the other axial end of said bearing assembly, having a radial thickness greater than the radial space between ball bearing and housing, and circumferentially engaging the housing;
   both the inner surface of said ball bearing at said one end thereof, and the outer surface of said ball bearing at said other end thereof, being longitudinally tapered; and
   means resiliently urging said two compensating members axially together so that the longitudinally tapered surfaces of the ball bearing overlap the respectively associated compensating members, thereby providing a firm support for said ball bearing in both radial and axial directions and permitting said ball bearing to self-align -its internal parts while assuming a position that may be slightly out of alignment with both shaft and housing.

2. In a rotary apparatus including a shaft having a substantially cylindrical outer surface, a housing having a substantially cylindrical inner surface and surrounding the shaft in substantially concentric relation thereto, a bearing of generally annular configuration having inner and outer races and disposed between the shaft and housing to support them radially in a relatively rotatable relation, and an axially slidable support means associated with one of said bearing races, an improved arrangement of the axially slidable support means comprising, in combination:
   the associated bearing race being of a different diameter from the associated shaft or housing so as to provide an annular space therebetween, said associated bearing race also having a generally cylindrical surface which faces toward the generally cylindrical surface of the associated shaft or housing and with a circumferential portion of said generally cylindrical bearing surface being longitudinally tapered;
   a generally ring-shaped compensating member engaging the generally cylindrical surface of the associated shaft or housing, said compensating member being made of a rigid material having elastic deformation capability and having a circumferential gap therein, said compensating member occupying said annular space and also engaging said longitudinally tapered surface portion of said associated bearing race;
   spring means urging said compensating member along said longitudinally tapered surface portion of said associated bearing race toward said generally cylindrical surface thereof; and the direction engagement of said tapered bearing race surface with said compensating member being such that the angle formed between said direction of engagement and a plane perpendicular to the longitudinal axis of the associated shaft or housing has a tangent which is greater than the coefficient of static friction between said compensating member and the associated shaft or housing, so that the bearing is firmly supported both radially and axially but said compensating member is free to slide axially relative to the associated shaft or housing under the force of said spring means whenever required to do so by thermal expansion or wear factors.

3. Apparatus as in claim 2 wherein said longitudinally tapered circumferential portion of said bearing race is at one end of said bearing race.

4. Apparatus as in claim 2 wherein said longitudinally tapered circumferential portion of said bearing race is located intermediate to the ends of said bearing race.

5. Apparatus as in claim 2 wherein said compensating member is of genrally circular cross-sectional configuration.

6. Apparatus as in claim 2 wherein said compensating member is of generally rectangular cross-sectional configuration.

7. In a rotary assembly in which a shaft and a housing are supported in a relatively rotatable relation by a bearing disposed about the shaft and inside the housing, a compensating member for occupying a radial gap between the bearing and one of the shaft or housing while also providing an axially slidable and possibly misaligned support for the bearing, said compensating member comprising:
a member made of rigid material having elastic deformation capability, shaped in a generally ring-shaped configuration but with a circumferential gap therein, so that it can be radially deformed against an interfitting cylindrical surface of the shaft or housing, and also having a cross-sectional configuration which will permit it to become slightly misaligned relative to the shaft or housing.

8. A compensating member as claimed in claim 7 which is of generally circular cross-sectional configuration.

9. A compensating member as claimed in claim 8 which is made of spring steel.

10. In a rotary assembly which includes a shaft, a housing, and a bearing having inner and outer generally cylindrical surfaces and supporting the shaft and housing for relative rotation, the improvement comprising:
the shaft diameter being smaller than the bearing inner surface and the housing inner diameter being larger than the bearing outer surface, thus providing corresponding inner and outer radial spaces adjacent the bearing;
inner and outer generally ring-shaped compensating members carried by the shaft and housing, respectively, and occupying the corresponding radial spaces;
each of the bearing surfaces having a circumferential surfaces portion which is longitudinally tapered and overlaps the associated compensating member;
each compensating member being made of elastically deformable rigid material with a circumferential gap therein and being of greater radial thickness than the associated radial space; and
means resiliently urging the compensating members axially together such that each compensating member engages the associated bearing surface with both radial and axial force, whereby the bearing may be supported in a position of misalignment relative to both the shaft and the housing.

11. The apparatus of claim 10 wherein each of said compensating members is of generally circular cross-sectional configuration and supports the associated bearing surface in a slightly non-concentric relation to the associated shaft or housing.

12. The method of constructing a rotary assembly comprising the steps of:
selecting a bearing having inner and outer surfaces adapted to directly engage a shaft and a housing, respectively;
selecting a shaft having an outer diameter which is smaller than said inner bearing surface;
placing the bearing about the shaft in substantially concentric relation thereto so as to provide a radial space therebetween;
selecting an inner compensating member of generally ring-shaped configuration with a circumferential gap therein, made of rigid material having elastic deformation capability, whose normal inner diameter is smaller than the shaft outer diameter, and whose radial thickness is greater than the radial thickness of said radial space;
deforming the inner compensating member radially outwardly and placing it about the shaft and in engagement with one end of the bearing;
selecting a housing having an inner diameter which is larger than said outer bearing surface;
placing the housing about the bearing in substantially concentric relation thereto so as to provide a radial space therebetween;
selecting an outer compensating member of generally ring-shaped configuration with a circumferential gap therein, made of rigid material having elastic deformation capability, whose normal outer diameter is greater than the inner diameter of the housing, and whose radial thickness is greater than the radial thickness of the radial space between bearing and housing;
deforming the outer compensating member radially inwardly and placing it within the housing in engagement with the inner surface thereof and also in engagement with the other end of the bearing; and
then resiliently urging the two compensating members axially together so as to grasp the bearing therebetween and to provide both axial and radial support for the bearing relative to the shaft and the housing.

13. The method of constructing a rotary assembly comprising the steps of:
selecting a bearing having inner and outer surfaces adapted to directly engage a shaft and a housing, respectively, one end of said inner surface being longitudinally tapered;
selecting a shaft whose outer diameter is smaller than the inner bearing surface;
placing the bearing about the shaft in substantially concentric relation thereto so as to provide a radial space therebetween;
selecting an inner compensating member of generally ring-shaped configuration with a circumferential gap therein, made of rigid material having elastic deformation capability, whose normal inner diameter is smaller than the outer diameter of the shaft, and whose radial thickness is greater than the radial thickness of said radial space;

deforming the inner compensating member radially outwardly and placing it about the shaft adjacent said one end of said bearing; and than resiliently urging the bearing and the inner compensating member axially together so that the compensating member comes into overlapping engagement with said longitudinally tapered inner end surface of the bearing and the compensating member exerts both radial and axial forces on the bearing;

the direction of engagement between the inner compensating member and the longitudinally tapered inner end surface of the bearing being selected to be such that the tangent of the angle between that direction and a plane perpendicular to the longitudinal axis of the shaft is greater than the coefficient of static friction between the compensating member and the shaft so that the compensating member remains in slidable relation to the shaft.

14. The method of constructing a rotary assembly comprising the steps of:

selecting a bearing having inner and outer surfaces adapted to directly engage a shaft and a housing, respectively, one end of said outer surfaces being longitudinally tapered;

selecting a housing whose inner diameter is larger than the outer bearing surface;

placing the housing about the bearing in substantially concentric relation thereto so to provide a radial space therebetween;

selecting an outer compensating member of generally ring-shaped configuration with a circumferential gap therein, made of rigid material having elastic deformation capability, whose normal outer diameter is larger than the inner diameter of the housing, and whose radial thickness is greater than the radial thickness of said radial space;

deforming the outer compensating member radially inwardly and placing it within the housing adjacent said one end of said bearing; and then resiliently urging the bearing and the outer compensating member axially together so that the compensating member comes into overlapping engagement with said longitudinally tapered outer end surface of the bearing and the compensating member exerts both radial and axial forces on the bearing;

the direction of engagement between the outer compensating member and the longitudinally tapered outer end surface of the bearing being selected to be such that the tangent of the angle between that direction and a plane perpendicular to the longitudinal axis of the bearing is greater than the coefficient of static friction between the compensating member and the bearing so that the compensating member remains in slidable relation to the bearing.

15. A bearing assembly comprising:

a shaft or housing;

a bearing disposed generally concentric to the shaft or housing but radially spaced therefrom to provide a generally annular space therebetween, said bearing being of generally cylindrical configuration but having a longitudinal tapered surface portion adjacent to said shaft or housing;

a compensating member of generally ring-shaped configuration but with a circmferential gap therein, made of rigid material having elastic deformation capability, said compensating member occupying said annular space and being radially deformed to forcibly seat upon said shaft or housing, said longitudinally tapered surfaces portion of said bearing overlapping said compensating member;

said compensating member having a cross-sectional configuration such as to permit it to become slightly misaligned relative to said shaft or housing; and spring means carried by said shaft or housing and urging said compensating member axially into engagement with said longitudinally tapered surface portion of said bearing.

16. The apparatus of claim 15 wherein said compensating member is of generally circular cross-sectional configuration.

17. A bearing assembly comprising:

a shaft;

a bearing disposed generally concentrically about said shaft in radially relation therto forming a generally annular space therebetween, said bearing having a generally cylindrical inner surface with a longituidnally tapered portion;

a compensating member made of rigid material having elastic deformation capability, said compensating member being of generally ring-shaped configuration with a circumferential gap therein, said compensating member being radially outwardly deformed and disposed in said annular space and forcibly seated upon said shaft in slidable relation thereto and in overlapping relation to said longitudinally tapered inner surface portion of said bearing;

spring means carried by said shaft and axially urging said compensating member to maintain engagement by its outer surface with said longitudinally tapered inner surface portion of said bearing; and said compensating member on its inner surface that engages said shaft having a convexly curved cross-sectional configuration so as to permit said compensating member to become slightly misaligned relative to said shaft.

18. A bearing assembly comprising:

a housing;

a bearing disposed generally concentrically within said housing in radially spaced relation thereto forming a generally annular space therebetween, said bearing having a generally cylindrical outer surface with a longitudinally tapered portion;

a compensating member made of rigid material having elastic deformation capability, said compensating member being of generally ring-shaped configuration with a circumferential gap therein, said compensating member being radially inwardly deformed and disposed in said annular space and forcibly seated within said housing in slidable relation thereto and in overlapping relation to said longitudinally tapered outer surface portion of said bearing;

spring means carried by said shaft and axially urging said compensating member to maintain engagement by its inner surface with said longituidnally tapered outer surface portion of said bearing; and said compensating member on its outer surface that engages said housing having a convexly curved cross-sectional configuration so as to permit said compensating member to become slightly misaligned relative to said housing.

* * * * *